(12) United States Patent
Astigarraga et al.

(10) Patent No.: US 10,230,649 B2
(45) Date of Patent: *Mar. 12, 2019

(54) STORAGE AREA NETWORK WORKLOAD BALANCING

(71) Applicant: International Business Machines Corporation, Armonk, NY (US)

(72) Inventors: Tara Astigarraga, Fairport, NY (US); Andrew L. Jones, Pima, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,466

(22) Filed: Jan. 24, 2018

(65) Prior Publication Data
US 2018/0152387 A1 May 31, 2018

Related U.S. Application Data

(63) Continuation of application No. 14/689,187, filed on Apr. 17, 2015.

(51) Int. Cl.
H04L 12/825 (2013.01)
H04W 4/12 (2009.01)
(Continued)

(52) U.S. Cl.
CPC .......... *H04L 47/25* (2013.01); *H04L 43/0817* (2013.01); *H04L 67/101* (2013.01);
(Continued)

(58) Field of Classification Search
CPC . H04L 43/0817; H04L 47/25; H04L 67/1008; H04L 67/101; H04L 67/1021
See application file for complete search history.

(56) References Cited

U.S. PATENT DOCUMENTS 6,453,360 B1 9/2002 Muller et al.
6,823,381 B1 * 11/2004 Harper .................... H04L 41/12
370/245

(Continued)

OTHER PUBLICATIONS

Disclosed Anonymously, "Optimal IO path checker", IP.com Prior Art Database Technical Disclosure, IP.com No. IPCOM000200261D, Oct. 3, 2010, pp. 1-3. http://ip.com/IPCOM/000200261.

(Continued)

*Primary Examiner* — Davoud A Zand
(74) *Attorney, Agent, or Firm* — Peter J. Edwards

(57) ABSTRACT

Storage area network (SAN) load balancing process is disclosed. The load balancing process can include monitoring an input/output workload within the SAN. The input/output workload of a first source to first destination is monitored by an analyzing unit. The analyzing unit gathers a source identifier (S_ID) and a destination identifier (D_ID) to determine the location of a first source and a first destination. An input/output workload of the first source and the first destination can be tracked by the analyzing unit. The analyzing unit can be used to determine if the first input/output workload is above an upper threshold. A first condition can be logged based on the determination of the first input/output workload being above the upper threshold. The determination of the first condition is communicated to a first user.

17 Claims, 7 Drawing Sheets

(51) Int. Cl.
*H04L 29/08* (2006.01)
*H04L 12/26* (2006.01)

(52) U.S. Cl.
CPC ...... *H04L 67/1008* (2013.01); *H04L 67/1021* (2013.01); *H04L 67/1097* (2013.01); *H04W 4/12* (2013.01)

(56) References Cited

U.S. PATENT DOCUMENTS

| | | | |
|---|---|---|---|
| 7,596,627 B2 | 9/2009 | Cometto et al. | |
| 7,734,808 B1 | 6/2010 | Bergamasco et al. | |
| 7,940,685 B1 | 5/2011 | Breslau et al. | |
| 8,073,944 B2* | 12/2011 | Harper | H04L 41/12 709/223 |
| 8,291,069 B1 | 10/2012 | Phillips | |
| 8,615,615 B2 | 12/2013 | Spry et al. | |
| 8,738,975 B2 | 5/2014 | Chiu et al. | |
| 2005/0114506 A1* | 5/2005 | Harper | H04L 41/12 709/224 |
| 2008/0005410 A1 | 1/2008 | Mies et al. | |
| 2008/0062891 A1 | 3/2008 | Van der Merwe et al. | |
| 2008/0275975 A1 | 11/2008 | Pandey et al. | |
| 2009/0106571 A1 | 4/2009 | Low et al. | |
| 2011/0022812 A1 | 1/2011 | van der Linden et al. | |
| 2013/0212349 A1 | 8/2013 | Maruyama | |
| 2013/0219079 A1 | 8/2013 | Padia et al. | |
| 2013/0232261 A1 | 9/2013 | Wright et al. | |
| 2013/0297832 A1 | 11/2013 | Ahmad et al. | |
| 2014/0032825 A1 | 1/2014 | Jeddeloh | |
| 2016/0308774 A1 | 10/2016 | Astigarraga et al. | |

OTHER PUBLICATIONS

He et al., "BPS: A Performance Metric of I/O System", 2013 IEEE 27th International Symposium on Parallel & Distributed Processing Workshops and PhD Forum, May 2013, pp. 1954-1962, © 2013 IEEE. DOI: 10.1109/IPDPSW.2013.64.

Mell et al., "The NIST Definition of Cloud Computing", Recommendations of the National Institute of Standards and Technology, NIST Special Publication 800-145, Sep. 2011, pp. 1-7, Gaithersburg, MD.

IBM, List of IBM Patents or Patent Applications Treated as Related, Jan. 19, 2018, 2 pages.

* cited by examiner

STORAGE AREA NETWORK WORKLOAD BALANCING

BACKGROUND

Aspects of the present disclosure relate to multicomputer data transferring, and more particular aspects relate to computer network monitoring.

Current storage area network (SAN) environments provide access to consolidated services to enhance storage capabilities. SAN environments allow for communication between a computer system and the SAN. The SAN can be off device storage that the computer system can access, without storing an excess of data on the computer system. Within some SAN environments a network of computer systems are connected to the SAN environment which can host both servers and storage. The hosted servers and storage transfer can be monitored to determine the workload upon the SAN.

SUMMARY

According to embodiments of the present disclosure, a method is proposed to monitor and enhance host to storage data path within a storage area network (SAN).

Embodiments, provide a method for load balancing an input/output workload within a storage area network (SAN). The input/output workload of a first source to first destination can be monitored by an analyzing unit. The analyzing unit can gather a source identifier (S_ID) and a destination identifier (D_ID) to determine the location of a first source and a first destination. An input/output workload of the first source and the first destination can be tracked by the analyzing unit. The analyzing unit can be used to determine if the first input/output workload is above an upper threshold. A first condition can be logged based on the determination of the first input/output workload being above the upper threshold. The determination of the first condition can then be communicated to a first user.

Embodiments, provide a system for load balancing an input/output workload within a SAN. The SAN can include at least, one or more servers, one or more storage units, and one or more switches. The one or more switches can be communicatively coupled between the one or more servers and the one or more storage units. The system can be operated upon by a computing device that includes at least, a memory, a processor device, and an analyzing unit. The analyzing unit can be communicatively coupled to the memory, the processor device, and the SAN through the one or more switches. The input/output workload of a first source to first destination can be monitored by the analyzing unit. In embodiments, the analyzing unit gathers a S_ID and a D_ID to determine the location of the source and the destination. An input/output workload of the first source and the first destination can be tracked by the analyzing unit. The analyzing unit can be used to determine if the first input/output workload is above an upper threshold. A first condition can be logged based on the determination of the first input/output workload being above the upper threshold. The determination of the first condition can then be communicated to a first user.

Embodiments, provide a computer program product for load balancing an input/output workload within a storage area network (SAN). The computer program product can include a computer storage device containing program instructions. The program instructions can cause the analyzing unit to monitor the input/output workload of a first source to first destination. The analyzing unit can gather a S_ID and a D_ID to determine the location of the source and the destination. An input/output workload of the first source and the first destination can be tracked by the analyzing unit. The analyzing unit can be used to determine if the first input/output workload is above an upper threshold. A first condition can be logged based on the determination of the first input/output workload being above the upper threshold. The determination of the first condition can then be communicated to a first user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
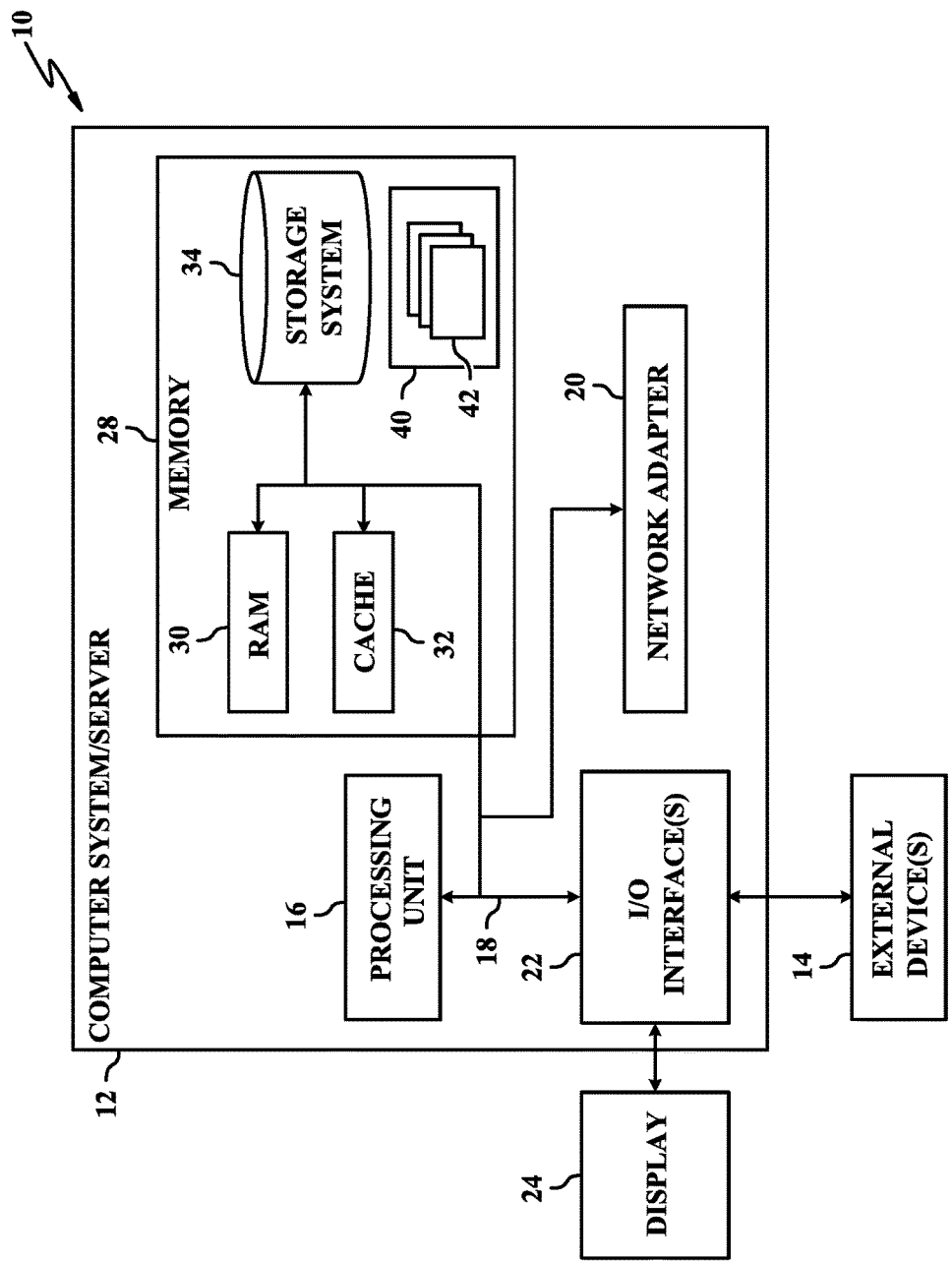
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate multicomputer data transferring, and more particular aspects relate to computer network monitoring. A storage area network (SAN) can be configured to connect users to data stored on another system. For the user to access the data, the user can connect to a server. The server can communicates with a series of storage units through a switch. The storage units can contain the data that the user wants to access. The switch connects servers to storage units within the SAN. An analyzing unit can be communicatively coupled to the switch to monitor the data flow between the server and the storage units. The analyzing unit can then communicate an input/output workload of the server to storage unit data transfers. While the present disclosure is not necessarily limited to such applications, various aspects of the disclosure can be appreciated through a discussion of various examples using this context.

SAN systems can be dedicated networks configured to transfer data between computing devices and storage networks. Examples of computing devices can include, but not limited to, servers, mobile computers, or wireless devices. The computing devices can communicate with the storage networks to retrieve data based on requests generated by the computing devices. In embodiments, an analyzing unit can be communicatively coupled within the fiber network to a switch. The switch can distribute a workload between a server and a storage unit. The server can be referred to as a source, and the storage device can be referred to as a destination. All of the sources and all of the destinations of a network can be connected to the switch and every source may communicate with every destination separately or in tandem depending on the configuration of the network.

To communicatively couple one or more sources and one or more destinations within the SAN, a fiber channel network can be utilized. The fiber channel network can contain the one or more sources and the one or more destination and allow users to connect to or access data stored on the one or more destinations. A host can be the source that a user may connect to within a SAN to run specific tasks or access a specific set of data. Between the one or more sources and the one or more destinations, switches can be introduced to communicatively couple each of the one or more sources to each of the one or more destinations. In various embodiments, the switches can be connected to an analyzing unit, which can monitor the traffic interactions between each of the one or more sources and each of the one or more destinations.

In some instances, physical information of the server is compiled for a server within a SAN. Examples of physical information of a server can include adapter model number, model name, serial number, manufacturer name, universally unique identifier (UUID), product identification, and manufacturer identification. The physical information of the server can be useful to identify what equipment is in the server. In some instances the physical information is unable to monitor the transfer of data between the server and storage.

To increase the visibility of a data path transfer, a host to target data path can be monitored to determine the current load status of the SAN. In SAN environments, host to target access is typically based on zoning setup and host to target login, fabric login (FLOGI), or port login (PLOGI). Although host to target data path utilization increases the visibility of the SAN, the host to target path utilization may not provide a centralized source of information. An example of centralized source of information could include a GUI that displays the status of the SAN and the Input/outputs of the sources and the destinations. The centralized source of information can be used to observe which hosts are actively driving input/output per second (IOPs) to storage units, and which hosts are just logged in but not being operated upon. An example of hosts logged in could include a server that is logged in on the network but not receiving any requests from users. This basic information can assist a network administrator to detect network input/output connectivity issues and troubleshoot issues that have already affected the SAN data flow. The host to target path can be described as a source-to-destination transfer further herein.

The transfer of the data can be maintained and oriented using the one or more switches that connect the one or more servers to the one or more storage units within the SAN. The switches can connect a first server to a first storage unit of a source-to-destination transfer. Each of the one or more servers and the one or more storage units can be connected to the one or more switches within the SAN to control the transfer of the data. An example storage unit within a SAN can include a redundant array of independent disks (RAID). In various embodiments, an analyzing unit can be implemented to monitor the data transfer between a source and a destination. The switch can be an analyzing unit. In some embodiments, the switch can be communicatively coupled to an external analyzing unit. The switch can also connect the first server to a second storage unit, or a second server to the first storage unit and the analyzing unit can monitor the data of each of the source-to-destination transfers.

In embodiments, the source can be the server and the destination can be the storage unit depending on input/output workload of data transpiring between the servers flowing to the storage units. For example, if a user requests a file stored on the storage unit, a server can request the file making the source the server. The server can then input the request of the file from the storage unit which will be the destination. In embodiments, the source can be the storage unit and the destination can be the server depending on the input/output workload of data transpiring between the storage units flowing to the servers. For example, the requested file can be sent from the storage unit to the server, where the storage unit becomes the source, and the server becomes the destination.

To measure the interactions between a source and a destination within a fiber network, a frames per second of a data transfer can be measured with an analyzing unit. The frames per second can include the transfer of frames from a first source to a first destination. In various embodiments, the analyzing unit can be communicatively coupled with the one or more switches of the SAN. In various embodiments, a first switch is communicatively coupled to a first analyzing unit, and a second switch is communicatively coupled to a second analyzing unit, and the analyzing units can output their data on to a singular storage table. In various embodiments, a first switch is communicatively coupled to a first analyzing unit, and a second switch is communicatively coupled to a second analyzing unit, and the analyzing units can output their data on to separate storage tables.

To prevent the sources from becoming overloaded or under-loaded, an upper threshold and a lower threshold can be placed upon the frames per second transfer between each source-to-destination transfer. An example of overloaded could include an input/output workload that is above an upper threshold. An example of under-loaded could include an input/output workload that is below a lower threshold.

To identify the sources and the destinations, identifiers can be used. A source identifier (S_ID) and a destination identifier (D_ID) can be gathered to determine which source is communicating to which destination. The S_ID, of the source, and the D_ID of the destination can both send a signal to the analyzing unit, where the analyzing unit can register the location of the source with the S_ID and the destination with the D_ID. The quantity of the workload of the transfer of the source-to-destination can be measured in frames per second within the fiber network. The more frames per second transpiring between a first source and a first destination the more overloaded source-to-destination can become, which can reduce computing power or slow down processing speed. The lesser the frames per second transpiring between a first source and a first destination are, the more under-loaded source-to-destination can become, underutilizing the processing power of the SAN.

To reduce inefficiencies the transfer of signals or frames per second transpiring between the first source and the first destination from being inefficient. The source-to-destination can be measured in frames per second as an input/output workload. If the input/output workload transpiring from the first source and the first destination is above the upper threshold a second source, a second destination, or a combination of both, can be implemented to relive some of the workload from the input/output workload of the first source and the first destination. The relief of the input/output workload to the second source and the second destination can be used to decrease the workload that was above the upper threshold. If the input/output workload transpiring from the first source and the first destination is below the lower threshold a second source, a second destination, or a combination of both, can be implemented to increase the workload of the input/output workload of the first source and the first destination. The increase of the input/output workload from the second source and the second destination can increase the workload that was below the lower threshold.

In various embodiments, the source and destination can be multiple units within a single chassis. The source can be a single unit with one or more sources located within a single source chassis. The destination can be a single unit with one or more destinations within a single destination chassis. Each of the one or more sources can have an individual S_ID within the single source chassis, and each of the one or more destinations can have an individual D_ID with in the single destination chassis. An example of the single source chassis can include a blade server chassis. The blade server chassis can include one or more blades. The blade server chassis can include an output with a switch that can communicatively connect the one or more blades with the one or more storage units within the SAN. The blades can be a single server that can operate on its own as a server but can be placed into the blade server chassis. The blade server chassis can be monitored by an analyzing unit to determine the workload on each of the one or more blades within the blade server. Information based on the workload of each of the one or more blades within the blade server can be displayed upon a GUI.

In various embodiments, the source and destination can be split into one or more nodes. The source can be split into one or more source nodes with individual S_IDs, and the destination can be split into one or more destination nodes with individual S_IDs. In various embodiments, the one or more source nodes and one or more destination nodes can connect and communicate between each other the same as a first source and a first destination would communicate.

In various embodiments, load balancing can be implemented on a SAN to properly utilize the whole network and a source or a destination from being underutilized or overburdened. Communication between the sources and the destinations can include a switch between the sources and the destinations that allow each source to communicate to each destination within a SAN. In various embodiments, the switch can include an analyzing unit which monitors a workload transfers of each of the sources to the destinations. For example within a fiber channel network, the transfers can be measured in frames, or frames per second transferred between the source and the destination. In embodiments, to prevent one server from being overloaded or underutilized the analyzing unit can display the current load status of each of the servers and the storage units of the SAN to allow a network administrator to properly load balance the SAN.

In various embodiments, the analyzing unit can implement an upper threshold and a lower threshold upon the servers and storage units. If the upper threshold or the lower threshold is reached by one of the source-to-destination transfers an alert can be generated to inform the network administrator. For example, if a first server is receiving an increased amount of requests by users, the network administrator can defer some of the requests to a second server to decrease a workload of the first server balancing the load between the first server and the second server. An example of the lower threshold can include, a first server not receiving the workload previously intended for the first server, the network administrator can defer some of the workload from a second server to increase the workload of the first server to properly utilize the computing power of the SAN. In another example of the lower threshold, if the first server is constantly performing below a set percentage of time the network administrator can defer the workload of the first server to a second server. In various embodiments, after deferring the workload from the first server to the second server the network administrator could reconfigure the first server to receive a different set of requests to properly utilize the computing power of the SAN.

In various embodiments, the efficiency of a network administrator can be increased by providing information about the SAN to the network administrator. Examples of information of the source to the destination transfer the network administrator could receive can include alerts. Alerts can inform the administrator of an upper threshold or a lower threshold being reached. In various embodiments a graphical user interface (GUI) that can display a current load status of the servers or storage units. An example of a GUI can include a central computer. The central computer can display the information based on the current workload status of a source-to-destination transfer. The information can assist the network administrator in finding which source-to-destination links are in need of distribution by being able to know which source links are preforming between the upper threshold and the lower threshold. The information can allow the network administrator to respond to issues more quickly, allowing for a shorter time where the links are under-preforming or overloaded. Examples of issues can include input/output bottlenecks, input/output links over the upper threshold, input/output links below the lower threshold, server failure, or storage failure. Examples of server failure can include server overload, power surges, or server intrusions. Examples of storage failure can include hard drive failures, controller failures preventing the user from being able to communicate with the server, power surges, or storage intrusions. Examples of intrusions within server or storage units can include viruses, system corruption, or inadvertent deletion.

In various embodiments, the availability of the information of the status of the source to the destination transfers gathered through the analyzing unit can be used for daily planning and workload distribution. Daily planning and workload distribution can allow the SAN to operate more efficiently by monitoring the SAN. The larger set of parameters can increase the efficiency of the SAN by: determining which source-to-destination transfers are currently under loaded or overloaded, identifying input/output bottlenecks, or load balancing the source-to-destination workload. An example of an input/output bottleneck can include a large process being sent from the source to the destination causing the flow of data to be slowed or stopped temporarily.

The information gathered on the status of the servers or the storage units can be used to determine port misbehavior, or limit planning with proper daily debugging of the SAN. When gathering the input/output workload between a source and a destination, an analyzing unit can monitor the ports sending the data as well as the workload. The analyzing unit can determine which port is misbehaving and alert the network administrator. An example of a port misbehavior can include slow workload productivity or errors in input/output workloads. In various embodiments, the analyzing unit can also alert the network administrator of load balancing opportunities to plan the limit of the SAN. The load balancing opportunities can include a first input/output workload that is under loaded or overloaded, which may be transferred to a second input/output workload. The load balancing opportunity, when utilized for limit planning, the efficiency of the SAN can be increased.

The information gathered by the analyzing unit can be used by the network administrator to properly load balance the server to the storage unit interactions within a SAN. The interactions between the server and the storage can be balanced based on the size of the SAN. The larger the SAN the more of the input/output workloads of the source-to-destination can be balanced to increase the efficiency of the SAN. This allows the network administrator to plan and distribute the input/output workload of the SAN based on information gathered from the analyzing unit of the SAN. The information can be gathered by a storage table. The information gathered by the storage table can be displayed on a graphical user interface (GUI). The GUI can inform the administrator of the current workloads of the input/output workload between the source and the destination. The information can also include alerts sent to the administrator based on the input/output workload being above an upper threshold, or below a lower threshold. The information can allow the network administrator the balance the input/output workload of the SAN to increase the efficiency of the SAN.

In various embodiments, the efficiency of the SAN can be increased by determining input/output workloads and adjusting the SAN for better load balancing. The properly load balanced input/output workload can increase the efficiency of the day to day operations of a SAN. For example, an unbalanced SAN can contain over preforming and/or underperforming source-to-destination transfers that not only can create bottlenecks within the input/output workload, but can also waste computing resources. If a source-to-destination transfer is over preforming components of the source and the destination can wear out faster decreasing the overall investment of the components. If the source-to-destination transfer is underperforming, the underutilized computing resources are being wasted. An efficiently operating SAN can properly utilize as well as not overwork the resources of the SAN.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
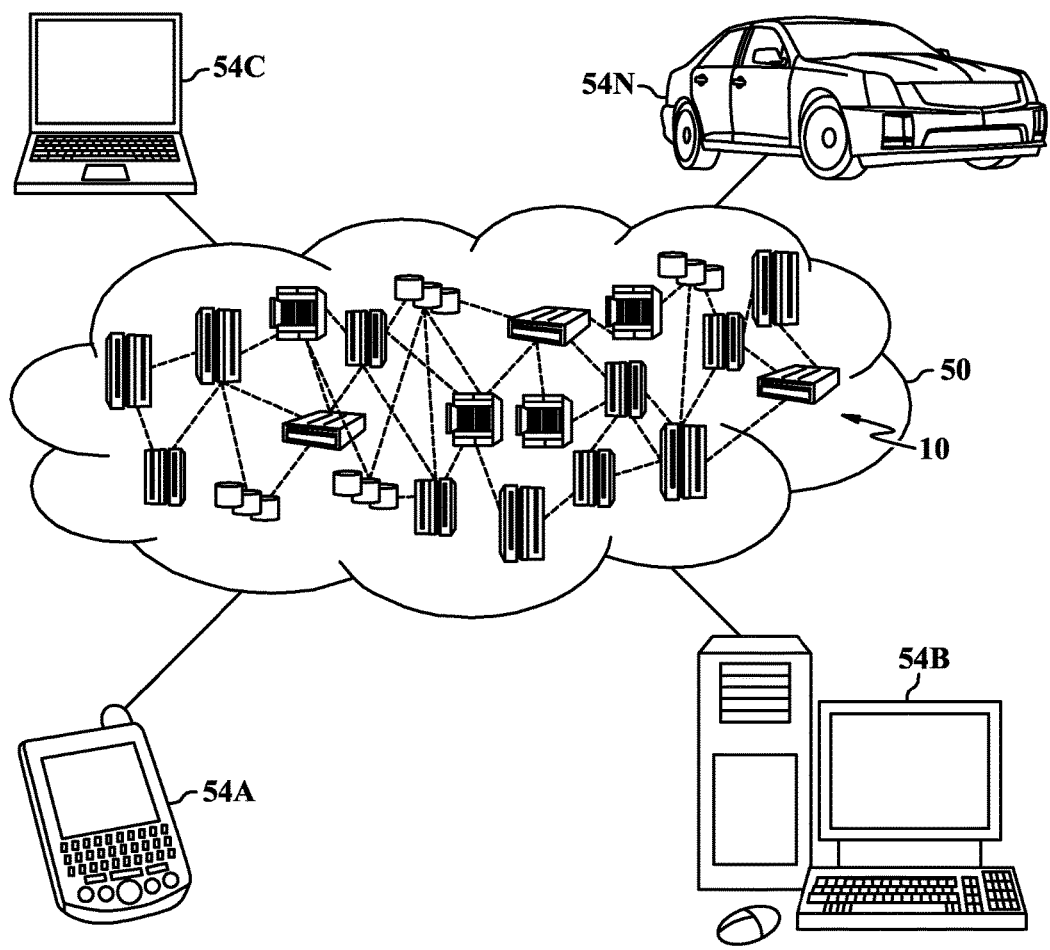
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
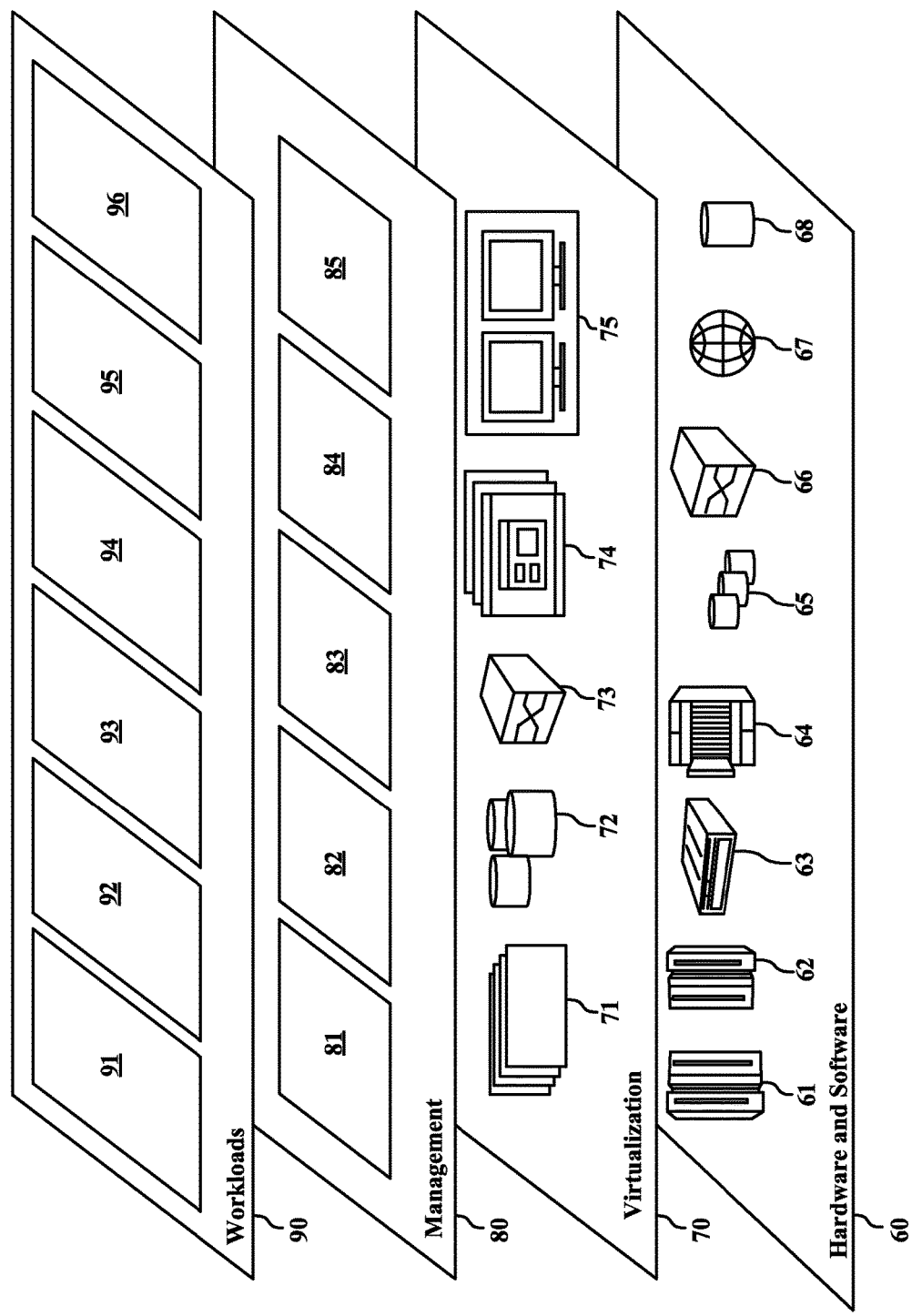
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

Figure 4:
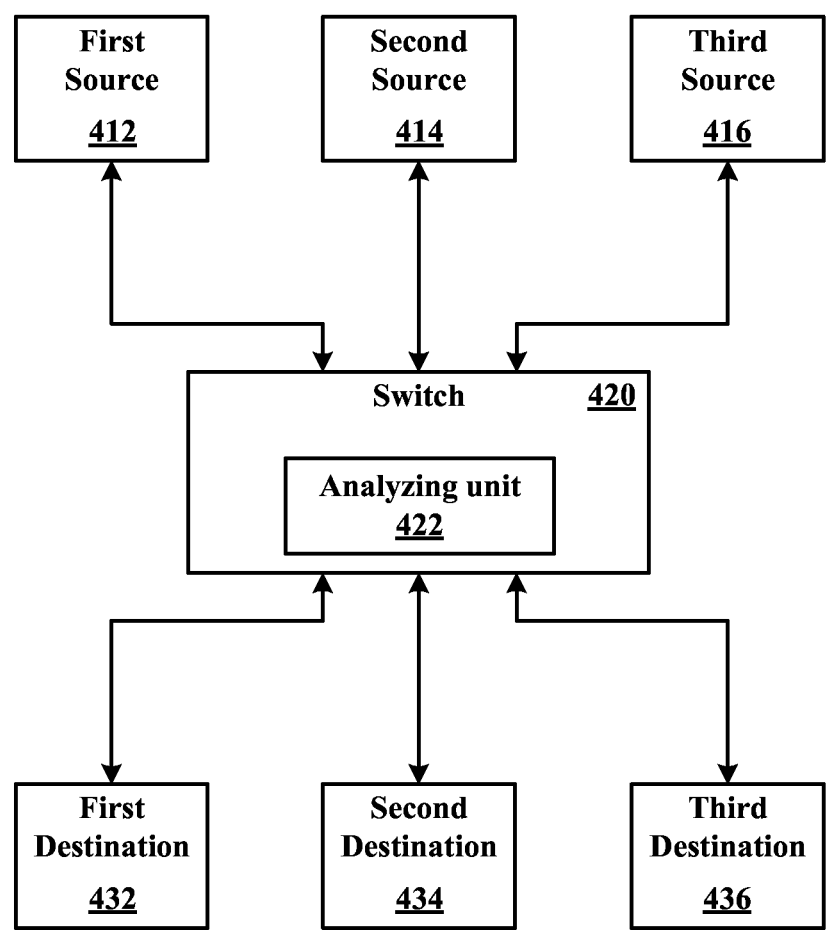
FIG. 4 depicts a diagram of a communication pathway between multiple source units and multiple destination units coupled by an analyzing unit that measures the input and output workload between the sources and the destinations, according to various embodiments.

In FIG. 4 an embodiment of a storage area network (SAN) with one or more sources, one or more destinations, and a switch is illustrated. The switch can be communicatively coupling the one or more sources to the one or more destinations. Within the SAN a first source 412, a second source 414, and a third source 416 are communicatively coupled to a switch 420. In various embodiments, the switch can be communicatively coupled to an analyzing unit 422.

In some embodiments the switch 420 can contain the analyzing unit. Through the switch 420, the sources are able to transfer requests to the destinations of the SAN. The destinations can include the first destination 432, the second destination 434, and the third destination 436. The sources can receive a request from a user that can require the source to connect to the switch which links the source to the destination that contains the request of the user.

In various embodiments, the switch 420 can include an analyzing unit 422 which can monitor the input/output workload between the sources and the destinations of the SAN. The SAN can measure the inputs/outputs between the sources and the destinations of the SAN by using a frames per second measurement of the transfer of the inputs/outputs.

In various embodiments, the configuration of a SAN can depend on how a network administrator wants a source to communicate to a destination. Depending on the configuration of the SAN each source can connect to each destination differently. In various embodiments, the network administrator may configure the SAN such that the first source 412 only communicates with the first destination 432 and the second destination 434. Another embodiment may only allow the second source 414 to communicate with the second destination 434, and the third destination 436. Another embodiment may only allow the third source 416 to communicate with the first destination 432, and the third destination 436. In various embodiments, the first source 412 may only be able to communicate with the first destination 432, whereas the second source 414 and the third source 416 can communicate with the first destination 432, the second destination 434, and the third destination 436.

To monitor traffic between the sources and the destinations, a mapping initiator can be incorporated through the analyzing unit. The traffic can be a host to storage interaction of the source-to-destination workload where the host, or source, communicates with the storage, or destination, and the communication is mapped by the analyzing unit. The mapping process can record which source and destination are communicating. To record the mapping process the source can communicate a source identifier or S_ID, and the destination can communicate a destination identifier D_ID. The S_ID and the D_ID can be sent to the analyzing unit and allow the analyzing unit to map a communication path of the source and the destination.

According to various embodiments, after recording the host to storage interactions of the SAN, the analyzing unit can output the information to a graphical user interface (GUI). For example, the analyzing unit can be configured to record and map the host to storage interactions between one or more sources and the switch 420, and the switch 420 and the one or more destinations. Where the one or more sources can include the first source 412, the second source 414, and the third source 416. The one or more destinations can include the first destination 432, the second destination 434, and the third destination 436.

In various embodiments, the analyzing unit can output the mapping of the host to storage interactions of the one or more sources and the one or more destinations to better monitor the SAN. The mapping can include using the source identifiers (S_ID) and the destination identifiers (D_ID) to determine the location of the source and the destination. The S_ID and the D_ID can assist the network administrator in daily debug operations. For example if the source-to-destination workload is not responsive. Knowing the locations of the source and the destination with the S_ID and the D_ID can decrease the amount of time to perform the debugging operation.

Figure 5:
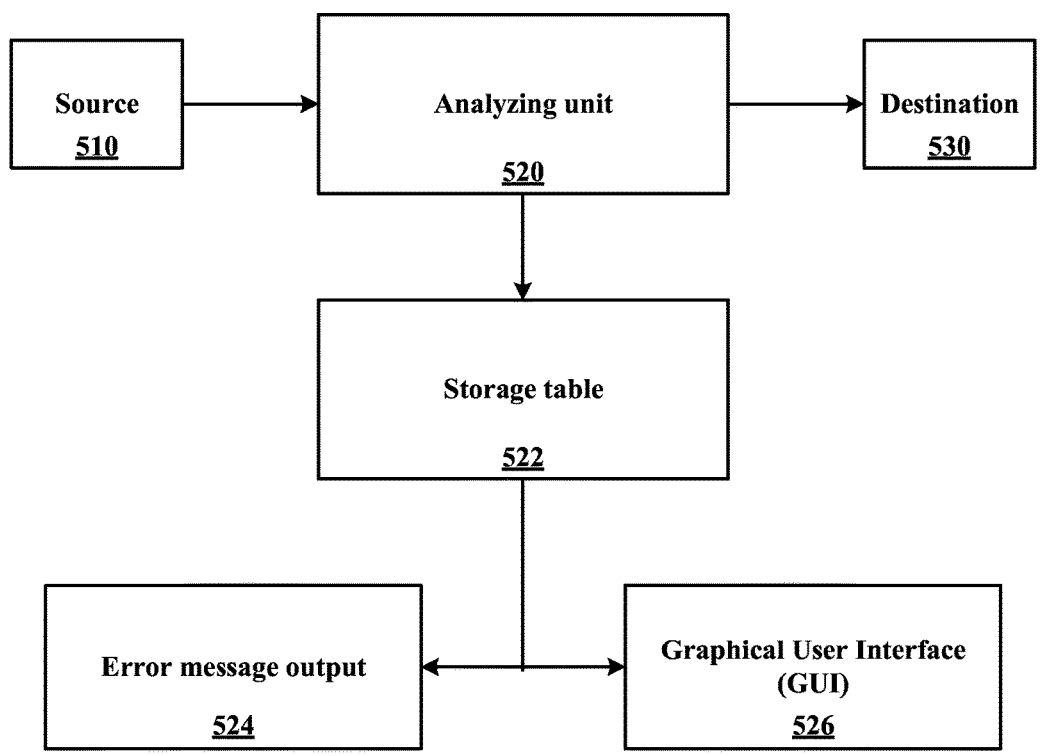
FIG. 5 depicts a diagram of the operations between a source and a destination, with an analyzing unit outputting a result based on operations per second of the source-to-destination transfer, according to various embodiments.

In FIG. 5 an embodiment of a storage area network (SAN) with an analyzing unit 520 is illustrated. The analyzing unit can monitor a source 510 to a destination 530 connection. The analyzing unit 520 can be communicatively coupled with a storage table 522. The analyzing unit 520 can be configured to determine the performance of the source 510 to destination 530 transfer. The storage table 522 can be configured to output a result based on the transfer between the source 510 and the destination 530, gathered by the analyzing unit 520. In embodiments the storage table 522 can be configured to send an error message output 524, or host a graphical user interface (GUI) 526. An error message output can include a message distributed to a network administrator, based on the status of the source 510 to destination 530 transfer. The GUI 526 can be implemented to display the transfer between the source 510 and destination 530.

In various embodiments, the analyzing unit 520 sends a result of the current source 510 to destination 530 transfer to the storage table 522. The storage table 522 can record the result from the analyzing unit 520 of the source 510 to destination 530 transfer. The storage table 522 can be configured by a network administrator depending on the needs of the SAN In various embodiments, the storage table 522 may be configured to record a current real time transfer rate between the source 510 and the destination 530. Each of the real time transfer rates can be recorded depending on what is transpiring between the source 510 and the destination 530. In various embodiments, the storage table 522 can record the transfer rates between the source 510 and the destination 530 at regular intervals. Examples of regular intervals can include recording the transfer every day, hour, minute, second, or millisecond, depending on the configuration of the network. For example, if a network has a sufficient amount of computing power the regular interval can be within the second and the millisecond range. A network with less computing power may record the regular intervals every minute, hour, or day. The storage table 522 can then output the current transfer rates between the storage 510 and the destination 530 on the graphical user interface (GUI) 526.

In various embodiments, the storage table 522 can also be configured to include an upper threshold and a lower threshold. The thresholds can be incorporated to determine if the storage 510 to the destination 530 transfer is over-loaded or under-loaded. If the transfer between the source 510 and the destination 530 is above the upper threshold or below the lower threshold, an error message output 524 can be outputted to inform the network administrator.

In various embodiments, the storage table 522 may be configured to only record transfer rates between the source 510 and the destination 530 that are higher than an upper threshold, or below a lower threshold. The storage table 522 can receive the transfer rate from the analyzing unit 520 for the transfer of data from the source 510 and the destination 530. If the transfer rate is above the upper threshold, the error message output 524 can be sent to the network administrator, and the GUI 526 can display the transfer rate. For example, if the transfer rate is above the upper threshold the error message output 524 can send the network administrator a message, informing the network administrator of the transfer rate being above the upper threshold. If the transfer rate is below the lower threshold, an error message output 524 can be sent to the network administrator, and the GUI 526 can display the transfer rate. For example, if the transfer rate is below the lower threshold, an error message output 524 can send the network administrator a message informing the network administrator of the transfer rate being below the lower threshold.

In various embodiments, the storage table 522 can be used to record a current real time transfer rate between the source 510 and the destination 530 on a first partition, record on a second partition of the transfer rate being above upper threshold, and record on a third partition being below the lower threshold. An example of a partition can include a separate section of the storage table 522, where the storage table can be split into one or more partitions that separate the determination of the source-to-destination workload In various embodiments, the storage table 522 with the first partition, the second partition, and the third partition can record simultaneously. For example if one or more sources 510 and one or more destinations 530 are being monitored by a first analyzing unit 520, the first analyzing unit 520 can monitor each transfer between the one or more sources 510 and the one or more destinations 530. For example, if one or more of the source-to-destination transfers are operating between the upper threshold and the lower threshold, the transfers can be recorded on the first partition. If one or more of the source-to-destination transfers are operating above the upper threshold, the transfers can be recorded on the second partition. If one or more of the source-to-destination transfers are operating below the lower threshold, the transfers can be recorded on the third partition.

In various embodiments, the error message output 524 can be configured to send alerts to the network administrator based on information gathered by the analyzing unit 520. An example of an alert can include a graphical based message outputted on the GUI 526, or a message sent to the network administrator. An example of a message could include a text based message, a graphical message, or a voice alert. The alert can be received for example upon a device operated by the network administrator or on the GUI. The text based error message output 524 can include an alert preamble, an identifier for source or destination that caused the error, and a location of the source or destination. The graphical error message output 524 can include information from the text based message, but displayed as a picture or graph. The voice alert error message output 524, can include the information from the text based message but audibly transmitted to the network administrator. The GUI 526 can include a GUI operating system, or a GUI interface. The GUI 526 can display current workloads of each of the source-to-destination transfers depending on the configuration of the storage table.

In various embodiments, if the storage table 522 is configured to only record the input/output workloads that are above than the upper threshold, or blow the lower threshold, the GUI 526 may only display those workloads. In various embodiments, if the storage table 522 records every input/output workload the GUI 526 can be configured to display every input/output workload.

Figure 6:
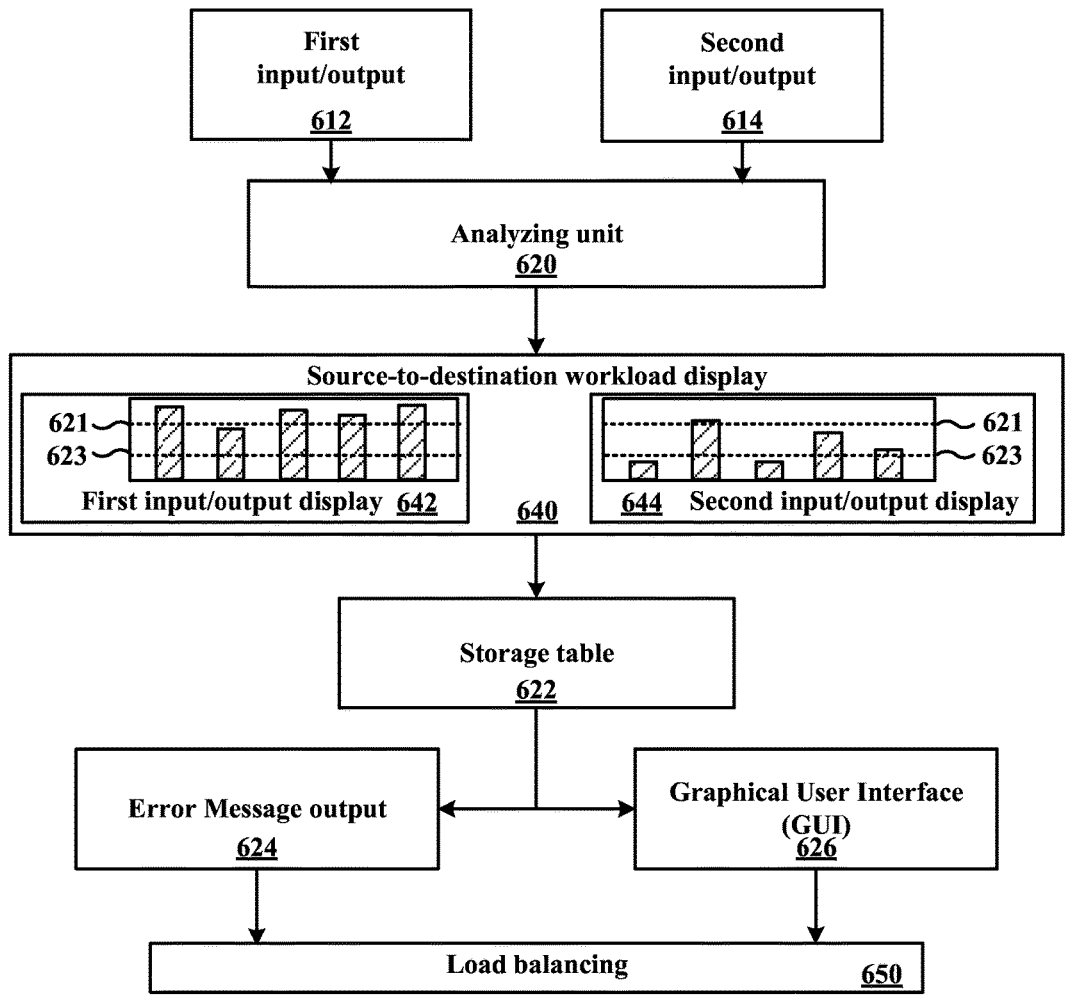
FIG. 6 depicts a diagram of a source load balancing as a result of the operations per second being outside the thresholds, according to various embodiments.

In FIG. 6, an embodiment of source-to-destination data transfer load balancing of a first input/output with one or more nodes and a second input/output with one or more nodes is depicted. The source-to-destination data transfer can be based on the input/output workload results gathered by an analyzing unit 620. To increase the efficiency of input/output workloads within a storage area network (SAN), the input/output workloads can be balanced to increase or decrease the workloads of the input/outputs of the SAN. In various embodiments, the analyzing unit 620 can create event logs which can be recorded by the storage table 622. Examples of event logs can include a current operating input/output workload of the source-to-destination transfer, an input/output workload being above an upper threshold, and an input/output workload being below a lower threshold. In various embodiments, the event logs within the storage table 622 can be accessed by a network administrator. The network administrator can access current event logs as well as past event logs which can be stored on the storage table 622.

The analyzing unit 620 can be used to determine the input/output workloads upon each source-to-destination transfer. A first input/output 612 transfer and a second input/output 614 transfer can be monitored by the analyzing unit 620 to determine a source-to-destination workload, which can be displayed on a source-to-destination workload display 640. The source-to-destination workload display 640 can display the first input/output display 642, and the second input/output display 644 on a graphical user interface (GUI) 626 after being recorded on the storage table 622. The graphical user interface (GUI) 626 can display the current workload status of the first input/output 612 and the second input/output 614.

In various embodiments, the first input/output 612 or the second input/output 614 could be a source and/or a destination. An example of a source as the first input/output could include a server blade chassis. Within a server blade chassis one or more server blades are combined and operate within the chassis. The server chassis can be configured to include a single output for all of the one or more blades included within the server chassis. Each of the one or more blades can be a stand-alone server. The blades can be combined within the server chassis to reduce a physical space usage. To monitor the workloads upon the one or more blades within the server chassis a switch can be located within the server chassis to determine which blades are communicating with which storage unit. Each of the one or more blades within the chassis can be assigned a source identifier (S_ID) which can be monitored by the analyzing unit 620. The analyzing unit 620 can be located within or communicatively coupled to the switch. In various embodiments, the switch can be located within the server chassis to determine which server blade is communicating to which storage unit outside the server chassis.

In an example, if a first server chassis with one or more blades can be being monitored by the analyzing unit 620, the analyzing unit 620 can display a first input/output display 642 of the first server chassis through the GUI 626. The S_ID can be used to identify the location of a blade within the server chassis. If the input/output workload of a first and third blade of a five blade server chassis is greater than an upper threshold 621 an event error can be logged upon a storage table 622. The logging of the storage table can include the event error of the first blade and the third blade of the first input output display 642 being greater than the upper threshold 621. After logging the even upon the storage table 622 an error message output 624 can be sent out, and the workload can be displayed upon a GUI 626.

In various embodiments, the first input/output 612 transfer, and the second input/output 614 transfer can include source-to-destination nodes or connection points. An example of a node can include the connection points of a multi blade server. Another example of a node can include a singular storage unit within a grouping of storage units. The first input/output display 642 and the second input/output display 644 can be configured to show the current loads of each of the nodes of the first input/output 612 and second input/output 614 respectively, though the GUI 626. In embodiments, the storage table 622 can record each of the current input/output node transfer workloads of the SAN. For example, if the first input/output 612 and second input/output 614 each have 5 nodes, the storage table 622 can record the current input/output workload of each of the 10 nodes.

In various embodiments, the source-to-destination load display 640 of the first input/output display 642, and the second input/output display 644 can display a workload status based on a time period. For example if the displays are configured to display load statuses over the day. The first input/output display 642 can measure the source-to-destination workload over a certain duration of time, and record the workload on the storage table 622. For example, if the storage table 622 is configured to record the workload every hour, the information displayed by the GUI 626 can display the workload of the day hour by hour. The information about the workload of the day can allow the system administrator to optimize the load balancing 650 of the SAN.

In various embodiments, the storage table 622 may record input/output workloads that have exceeded a threshold of the input/output transfer from a source to a destination. The storage table can be monitored to determine an optimization of the input/output workload of the source-to-destination transfer. The storage table 622 may only record the input/output workload of the nodes that are above the upper threshold 621 or below the lower threshold 623, of the source-to-destination workload display 640. For example, if a first node and a third node of a five node source-to-destination workload display 640 are above the upper threshold 621, the workload of the first node and the third node can be recorded on the storage table 622. In an example, if the second node is below the lower threshold 623 in a five node source-to-destination workload display 640, only the second node may be recorded on the storage table 622. In an example, if none of the nodes are above the upper threshold 621 or below the lower threshold 623, the network administrator can configure the storage table 622 not record anything on the storage table. In another example, if none of the nodes are above the upper threshold 621, or below the lower threshold 623, the network administrator can configure the storage table 622 to record that all of the input/outputs of each of the nodes to be between the upper threshold 621 and the lower threshold 623.

In various embodiments, after the storage table 622 records the current workload information from the source-to-destination workload display 640, depending on the current load status an error message output 624, and/or a GUI 626 can be initialized. The error message output 624 can output an error message based on the input/output workload recorded by the storage table 622. If the first input/output display 642 or the second input/output display 644 is above the upper threshold 621, or below the lower threshold 623 the workloads can be recorded upon the storage table 622.

In various embodiments, the storage table 622 can record additional factors pertaining to the input/output workloads of the input/output transfer of a source-to-destination workload. Depending upon the configuration of the SAN, the storage table 622 can record additional factors along with the input/output workload exceeding the upper threshold 621 or the lower threshold 623. An example of additional factors can include measureable frequency limits upon the upper threshold and the lower threshold. Examples of measureable frequency limits of the source-to-destination exceeding the upper threshold 621 or the lower threshold 623 can include a percentage of time where the input/output workload is outside the thresholds compared to within the thresholds, how often within a set time period the input/output workload is outside the thresholds, how long the input/output workload is outside the thresholds, or during what time periods the input/output workload is outside the thresholds.

The error message output 624 and GUI 626 can be used to inform the network administrator of the current workload status of the SAN. The source-to-destination workload display 640 can be displayed upon the GUI 626. The error message output 624 can issue a first condition in response to the input/output workload being above the upper threshold 621, or a second condition in response to the input/output workload being below the lower threshold 623. A third condition, can be generated in response to the input/output workload being below the lower threshold 623 based on a frequency the input/output workload is below the lower threshold 623 described further herein.

In various embodiments, the workload can be balanced to distribute the workload between the first input/output display 642 and the second input/output display 644. The distribution of the workload can be used to optimize the efficiency of the workload of the SAN. The balancing of the workload can be done in portions. A portion can be a part or section of a whole. The portion for example, can be measured in percentages or fractions of the whole. An example of the portion can include a part or collection of communications of the source-to-destination transfer. A portion can include a communication grouping of all of the input/outputs of a first source to a first destination. An example of a portion could include a 20% workload source-to-destination transfer of a first source to a first destination. Another example of a portion could include a grouping of much smaller 1% workloads, which can be distributed to balance the workloads more minutely.

After the workloads are stored on the storage table 622, depending on the current status of the input/output workloads a load balancing 650 step can be implemented to balance a first workload and a second workload within the SAN. In various embodiments, the source-to-destination workload display 640 can display a first input/output display 642, and a second input/output display 644. The first input/output display 642 and the second input/output display 644, can be displayed by the GUI 626. In various embodiments, one or more GUIs can be utilized to display each input/output display singularly on separate GUIs.

In various embodiments, the load balancing 650 process can be completed by a system administrator. For example, a system administrator can use a graphical user interface (GUI) to determine a current workload status. The current workload status can be displayed on a source-to-destination workload display 640 where the first input/output display 642, and the second input/output display 644 are located. The system administrator can then balance the workload to optimize the workload of the SAN.

In various embodiments, the load balancing 650 process can be completed by a computer program. For example, a computing device can receive an input from the error message output 624, and initialize the load balancing 650 process. The current workload status can be accessed of the source-to-destination workload display 640 where the first input/output display 642, and the second input/output display 644 are located. The computer program can then balance the workload to optimize the workload of the SAN.

In various embodiments, the load balancing 650 process can balance all of the nodes within the system to be at an equal source-to-destination workload. For example if a 10 node SAN system is to be balanced, the load balancing 650 process can distribute a source-to-destination workload to each of the 10 nodes. The distributed workload can be below the upper threshold 621, and above the lower threshold 623.

In various embodiments, the load balancing 650 process can balance the source-to-destination workloads that are above the upper threshold 621 or below the lower threshold 623. For example, if a first source-to-destination workload is above the upper threshold 621, the first source-to-destination workload can distribute a portion of an excess workload through the load balancing 650 process. The excess workload from the first source to first destination workload can be transferred to a second source-to-destination workload. In another example, if a first source-to-destination workload is below the lower threshold 623, the first source-to-destination workload can distribute a portion of an underactive workload through the load balancing 650 process. The underactive workload from the first source to first destination workload can be transferred to a second source-to-destination workload.

Figure 7:
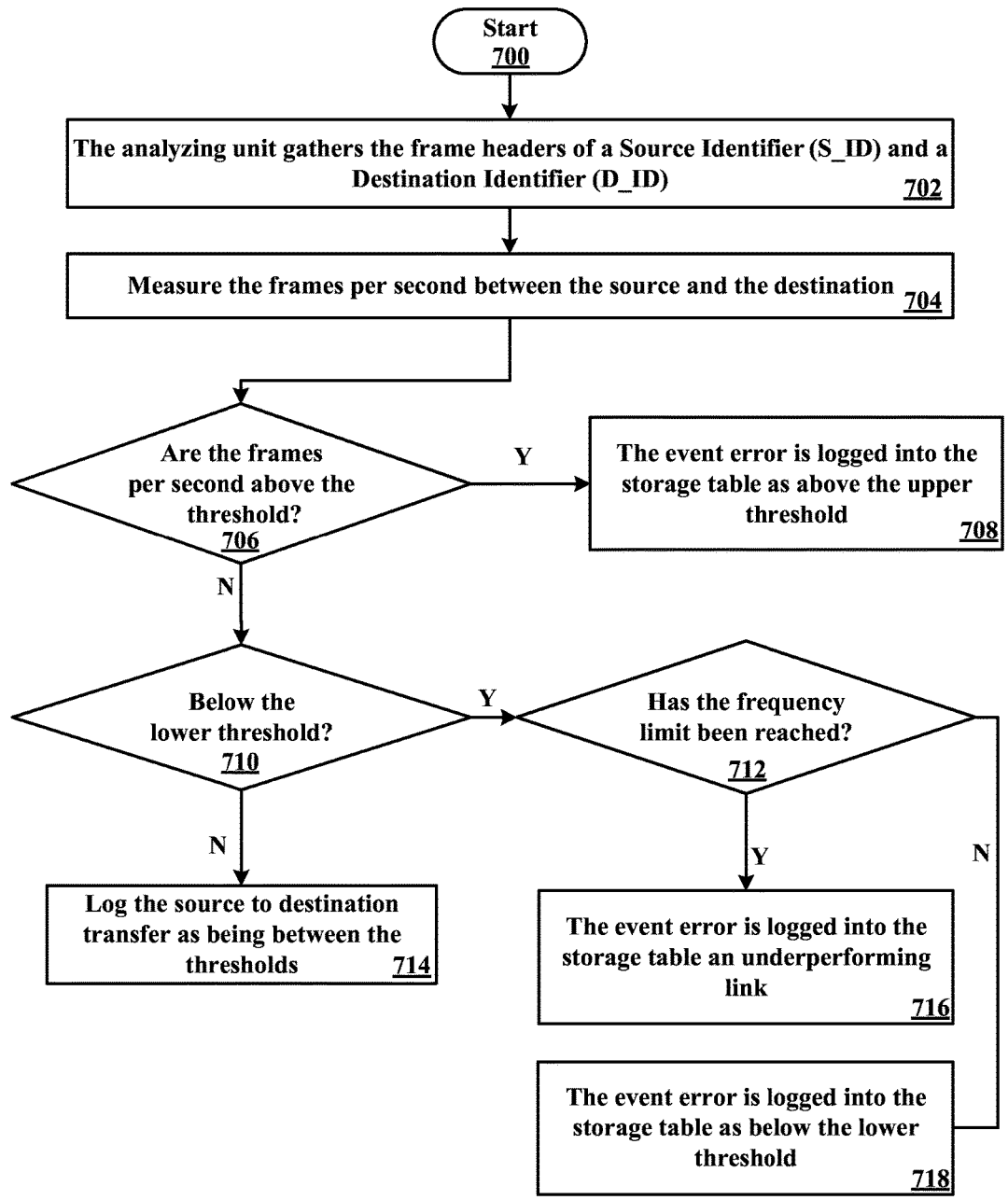
FIG. 7 depicts a flow chart of a comparison between the operations per second of a source and a destination resulting in event logs created by an analyzing unit depending on the thresholds, according to various embodiments.

In FIG. 7, a flow chart of the comparison between the operations per second or an input/output workload of a source and a destination, resulting in event logs created by an analyzing unit is depicted. When the method is applied to a fiber network, the input/output workload of a source and a destination can be measured in frames per second. The frames per second of the source-to-destination workload can be measured and recorded to determine proper load balancing processes. In operation 700, the process is started.

In operation 702, the source identifier (S_ID) and the destination identifier (S_ID) are gathered by the analyzing unit to determine the location of the source and the destination. The S_ID and the D_ID are generally 3 bytes of data generated within a frame header to indicate the location or address identifier from which the source-to-destination transfer originated and was received. The determination of the location of the source and the destination can be accomplished by using the analyzing unit to gather the S_ID from source frame header, and the D_ID from the destination frame header.

In operation 704, the frames per second transfer between the source and the destination are measured. The analyzing unit can gather the inputs/outputs per second (I/OPs) between a source and a destination. Depending on the configuration of the network, the analyzing unit can measure the current frames per second transfer. The frames per second transfer can be measured to determine if the transfer is above an upper threshold, below a lower threshold, or between the upper threshold and the lower threshold. The measurement of the frames per second can be done by the analyzing unit. For example, the analyzing unit can measure the frames per second with a packet analyzer or simple network management protocol (SNMP).

In decision block 706, the frames per second are determined to be either above the upper threshold, or below the upper threshold. To be above the upper threshold the measured frames per second transfer must have reached a transfer the upper threshold. An example could include, if the upper threshold was set at a limit of 70%. If the measured frames per second are above a 70% limit, an analyzing unit can record an event error upon a storage table. If the measured frames per second are above the upper threshold, the procedure flows to operation 708. If the measured frames per second are below the upper threshold the process flows to operation 710. If the measured frames per second are below the upper threshold, the measured frames per second can be either below the lower threshold, or between the upper threshold and the lower threshold.

In operation 708, the event error of the frames per second being above the upper threshold can be logged into a storage table that records the event error. In various embodiments, the event error of the measured frames per second being above the upper threshold can also send an error message to a network administrator, or be outputted on a GUI. For example the storage table can record information about the storage to destination transfer being above the upper threshold. Examples of information can include the current workload, the S_ID, the D ID, the current time, or a length of time. The GUI can also be configured to display the information recorded on the storage table.

In decision block 710, the frames per second are determined to be either above the lower threshold, or below the lower threshold. To be below the lower threshold, the measured frames per second must have reached a level below the lower threshold. An example could include, if the lower threshold was set at a limit of 30% if the measured frames per second are below a 30% limit the measured frames per second would be below the lower threshold. If the measured frames per second are below the lower threshold the procedure flows to operation 712. If the measured frames per second are above the lower threshold the procedure flows to operation 714.

In decision block 712, the measured frames per second are compared to the storage table to determine a frequency limit of the source-to-destination being below the lower threshold. Examples of measureable frequency limits of the source-to-destination being below the lower threshold can include, a percentage of time where the frequency is below the lower threshold compared to above the lower threshold, how often within a time period, how long, or during what time periods. The frequency limit can be used to determine, how often the measured frames per second are below the lower threshold. An example of the frequency limit can include, the amount of times in a set period the measured frames per second are below the lower threshold. An additional example of the frequency limit can include a set percentage of time at which the frames per second are below the lower threshold. An additional example of the frequency limit can include how long the measured frames per second being below the lower threshold, or a time of day the frames per second are most often below the lower threshold. The frequency examples can be used as stand-alone determinations, or can be used in conjunction with each other. If the frequency limit has been reached the process proceeds to operation 716. If the frequency limit has not been reached the process proceeds to operation 718.

In operation 716, the frequency limit has been reached, and the event error and frequency error are logged into the storage table. In embodiments the event error can be logged as a storage to destination transfer being below the lower threshold and having reached the frequency limit. If the frequency limit has not been reached the process proceeds to operation 718. In various embodiments, the event error of the measured frames per second being below the lower threshold and reaching a frequency limit can also send an error message to a network administrator, or be outputted on a graphical user interface (GUI).

In operation 718, the event error of the frames per second being below the lower threshold can be logged into the storage table to record the event error. In various embodiments, the event error of the measured frames per second being below the lower threshold can also send an error message to the network administrator. In various embodiments, the event error of the measured frames per second being below the lower threshold can also send an error message to a network administrator, or be outputted on a graphical user interface (GUI). For example, the storage table can record information about the storage to destination transfer being below the lower threshold. Examples of information can include the current workload, the S_ID, the S_ID, the current time, or a length of time. The GUI can also be configured to display the information recorded on the storage table.

If the measured frames per second in operation 710 was not below the lower threshold, the process proceeds to operation 714. In operation 714, the measured frames per second were not operating above the upper threshold, or below the lower threshold, which can result in the measured frames per second between the upper threshold and the lower threshold. If the measured frames per second are between the upper threshold and the lower threshold the source-to-destination transfer is recorded in the storage table as being between the thresholds.

In various embodiments, the measured frames per second operating between the upper threshold and the lower threshold the current workload may not be logged as the source-to-destination transfer is operating within the thresholds. In various embodiments, the storage table may still log the current workload even though the workload is between the upper threshold and the lower threshold.

The GUI can be used to provide a centralized grouping of information to be utilized by the network administrator. Depending upon the workload of the source-to-destination transfer the GUI can display information relative to the SAN. The information displayed upon the GUI can be utilized by the network administrator to troubleshoot issues within the SAN. Troubleshooting can include identifying bottlenecks, identifying connectivity issues, daily debugging, or workload balancing.

In various embodiments, the upper threshold and the lower threshold are adjustable depending on the network. In various embodiments, the error messages sent to the network administrator are based on the event error logged into the storage table. Examples of error messages can include, text based messages. Examples of text based messages can include, a text message to a mobile device, an email to a device, or a message displayed on a graphical user interface (GUI). For example, if a source-to-destination transfer is operating above the upper threshold, the GUI can display a message or a graph relating to the source-to-destination transfer operating above the upper threshold.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for load balancing an input/output workload within a storage area network environment, the method comprising:
   determining a first input/output workload between a first source and a first destination of a storage area network;
   determining a location of the first source with a first source identifier;
   determining a location of the first destination with a first destination identifier;
   tracking the first input/output workload between the first source and the first destination with an analyzing unit;
   determining that the first input/output workload is above an upper threshold;

logging the first input/output workload as a first condition into a storage table in response to the determination of the first input/output workload being above the upper threshold;
communicating the determination of the first condition to a first user
monitoring the determination of the first condition to the storage table;
determining a status of the first input/output workload of the first source to the first destination, wherein the determining comprises:
  monitoring a first duration of time where the first input/output workload is above the upper threshold;
  determining a first percentage of time that the first input/output workload is above the upper threshold; and
in response to determining the first condition, distributing a portion of the input/output workload of the first source to the first destination to an input/output workload of a second source to a second destination.

2. The method of claim 1, wherein the communicating includes transmitting a mobile phone message to the first user.

3. The method of claim 1, wherein the communicating includes displaying the determination on a graphical user interface to the first user.

4. The method of claim 1, further comprising:
determining a second input/output workload between a second source and a second destination of the storage area network;
determining a location of the second source with a second source identifier;
determining a location of the second destination with a second destination identifier;
tracking the second input/output workload between the second source and the second destination with the analyzing unit;
determining that the second input/output workload is below a lower threshold;
logging the second input/output workload as a second condition into the storage table in response to the determination of the second input/output workload being below the lower threshold; and
communicating the determination of the second condition to the first user.

5. The method of claim 4, further comprising:
monitoring the determination of the second condition to the storage table; and
determining a status of the second input/output workload of the second source to the second destination.

6. The method of claim 5, wherein determining the status of the input/output workload further comprises:
monitoring a second duration of time where the second input/output workload from the second source to the second destination is below the lower threshold;
monitoring a second frequency of how often the second input/output workload from the second source to the second destination is below the lower threshold; and
determining a third condition of an underactive second input/output workload based on the frequency of the second condition.

7. The method of claim 6, wherein the frequency is relative to a percentage of time the second input/output workload is below the lower threshold.

8. The method of claim 6, wherein the frequency is relative to how often the second input/output workload is below the lower threshold within a set period of time.

9. The method of claim 4, further comprising:
in response to determining the second condition, distributing a portion the input/output workload of the second source to the second destination to an input/output workload of a first source to a first destination.

10. The method of claim 1, wherein the determination of the location of the first source results in the location of a source within a single source chassis.

11. The method of claim 10, wherein the source is a blade of a blade server of the single source chassis.

12. A system for managing a storage area network, comprising:
a storage area network comprising:
  one or more servers,
  one or more storage units, and
  one or more switches that communicatively couple the one or more servers to the one or more storage units to control an input/output workload transpiring between the one or more servers and one or more storage units;
a memory;
a processor device communicatively coupled to the memory; and
an analyzing unit communicatively coupled to the memory, the processor device, and the storage area network, wherein the analyzing unit is configured to:
  determine a first input/output workload between a first source and a first destination of the storage area network,
  determine a location of the first source with a first source identifier,
  determine a location of the first destination with a first destination identifier,
  track the first input/output workload between the first source and the first destination with an analyzing unit,
  determine that the first input/output workload is above an upper threshold,
  log the first input/output workload as a first condition into a storage table in response to the determination of the first input/output workload being above the upper threshold,
  communicate the determination of the first condition to a first user
  monitor the determination of the first condition to the storage table;
  determine a status of the first input/output workload of the first source to the first destination, wherein the determining comprises:
    monitoring a first duration of time where the first input/output workload is above the upper threshold;
    determining a first percentage of time that the first input/output workload is above the upper threshold; and
  in response to determining the first condition, distribute a portion of the input/output workload of the first source to the first destination to an input/output workload of a second source to a second destination.

13. The system of claim 12, wherein the first source is a server of the storage area network.

14. The system of claim 12, wherein the first destination is a storage unit of the storage area network.

15. The system of claim 12, wherein the analyzing unit is further configured to:

determine a second input/output workload between a second source and a second destination of the storage area network;

determine a location of the second source with a second source identifier;

determine a location of the second destination with a second destination identifier;

track the second input/output workload between the second source and the second destination with the analyzing unit;

determine that the second input/output workload is below a lower threshold; and log the first input/output workload as the of a second condition into the storage table in response to the determination of the second input/output workload being below the lower threshold, and communicate the determination of the second condition to the first user.

16. A computer program product for managing a storage area network comprising a computer storage device having program instructions that are executable on a computing device and cause the computing device to:

determine a first input/output workload between a first source and a first destination of a storage area network;

determine a location of the first source with a first source identifier;

determine a location of the first destination with a first destination identifier;

track the first input/output workload between the first source and the first destination with an analyzing unit;

determine that the first input/output workload is above an upper threshold;

log the first input/output workload as a first condition into a storage table in response to the determination of the first input/output workload being above the upper threshold;

communicate the determination of the first condition to a first user monitor the determination of the first condition to the storage table;

determine a status of the first input/output workload of the first source to the first destination, wherein the determining comprises:

monitoring a first duration of time where the first input/output workload is above the upper threshold;

determining a first percentage of time that the first input/output workload is above the upper threshold; and in response to determining the first condition, distribute a portion of the input/output workload of the first source to the first destination to an input/output workload of a second source to a second destination.

17. The computer program product of claim 16, wherein the program instructions cause the computing device to be further configured to:

determine a second input/output workload between a second source and a second destination of the storage area network;

determine a location of the second source with a second source identifier;

determine a location of the second destination with a second destination identifier;

track the second input/output workload between the second source and the second destination with the analyzing unit;

determine that the second input/output workload is below a lower threshold;

log the second input/output workload as a second condition into the storage table in response to a determination of the second input/output workload being below the lower threshold; and communicate the determination of the second condition to the first user.

* * * * *